United States Patent
Pomerantz (10) Patent No.: US 7,996,892 B2
(45) Date of Patent: Aug. 9, 2011

(54) METHOD AND APPARATUS FOR USING A PROXY TO MANAGE CONFIDENTIAL INFORMATION

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/129,006

(22) Filed: May 29, 2008

(65) Prior Publication Data

US 2008/0229395 A1    Sep. 18, 2008

Related U.S. Application Data

(63) Continuation of application No. 11/149,393, filed on Jun. 9, 2005, now abandoned.

(51) Int. Cl.
G06F 9/00 (2006.01)
G06F 15/16 (2006.01)
G06F 17/00 (2006.01)

(52) U.S. Cl. ............... 726/12; 726/4; 726/20; 713/152; 713/153

(58) Field of Classification Search .............. 713/152, 713/153; 726/4, 12, 20
See application file for complete search history.

(56) References Cited

U.S. PATENT DOCUMENTS

| | | | |
|---|---|---|---|
| 4,814,988 A * | 3/1989 | Shiotani et al. | 704/5 |
| 5,826,268 A * | 10/1998 | Schaefer et al. | 1/1 |
| 5,940,591 A * | 8/1999 | Boyle et al. | 726/3 |
| 5,960,080 A * | 9/1999 | Fahlman et al. | 380/252 |
| 6,334,101 B1 * | 12/2001 | Hetherington et al. | 704/8 |
| 6,512,835 B1 | 1/2003 | Numao et al. | |
| 6,587,946 B1 | 7/2003 | Jakobsson | |
| 6,795,923 B1 * | 9/2004 | Stern et al. | 726/12 |
| 6,879,998 B1 * | 4/2005 | Raciborski et al. | 709/219 |
| 6,920,495 B1 * | 7/2005 | Fuselier et al. | 709/224 |
| 6,938,170 B1 * | 8/2005 | Kraft et al. | 726/23 |
| 6,996,841 B2 * | 2/2006 | Kadyk et al. | 726/12 |
| 7,065,514 B2 * | 6/2006 | Yang-Stephens et al. | 1/1 |
| 7,093,121 B2 * | 8/2006 | Barton et al. | 713/150 |
| 7,146,505 B1 * | 12/2006 | Harada et al. | 713/185 |
| 7,174,565 B2 * | 2/2007 | Kadyk et al. | 726/12 |
| 7,451,481 B2 * | 11/2008 | Bauer et al. | 726/3 |
| 7,475,341 B2 * | 1/2009 | Malik | 715/249 |
| 7,757,278 B2 * | 7/2010 | Boneh et al. | 726/12 |
| 2002/0054090 A1 * | 5/2002 | Silva et al. | 345/747 |
| 2002/0138529 A1 * | 9/2002 | Yang-Stephens et al. | 707/530 |
| 2002/0157019 A1 * | 10/2002 | Kadyk et al. | 713/201 |
| 2003/0079120 A1 * | 4/2003 | Hearn et al. | 713/150 |

(Continued)

FOREIGN PATENT DOCUMENTS

EP    1494429 A2    5/2008

*Primary Examiner* — David García Cervetti
(74) *Attorney, Agent, or Firm* — Yee & Associates, P.C.; Justin M. Dillon (57) ABSTRACT

A method, apparatus, and computer usable code for managing confidential data. A request is received to access an application from a user, wherein the application includes logic to process the confidential data. One of a first interface or a second interface is selected based on an identification whether the user is permitted to see the confidential data to form a selected interface in response to receiving the request. A selected interface is presented to the user. The first interface presents the confidential information and second interface presents non-confidential information without presenting the confidential information. The second interface allows access to the logic in the application without accessing the confidential data.

19 Claims, 8 Drawing Sheets

U.S. PATENT DOCUMENTS

| | | | |
|---|---|---|---|
| 2003/0097574 A1* | 5/2003 | Upton | 713/183 |
| 2003/0131259 A1* | 7/2003 | Barton et al. | 713/201 |
| 2003/0182453 A1* | 9/2003 | Kim et al. | 709/246 |
| 2003/0208619 A1* | 11/2003 | Rossbach et al. | 709/238 |
| 2004/0015725 A1* | 1/2004 | Boneh et al. | 713/201 |
| 2004/0143738 A1* | 7/2004 | Savage et al. | 713/168 |
| 2004/0199665 A1* | 10/2004 | Omar et al. | 709/238 |
| 2004/0260821 A1* | 12/2004 | Yamamoto et al. | 709/229 |
| 2005/0278626 A1* | 12/2005 | Malik | 715/530 |
| 2005/0278627 A1* | 12/2005 | Malik | 715/530 |
| 2006/0005017 A1* | 1/2006 | Black et al. | 713/165 |
| 2006/0010103 A1* | 1/2006 | Malik | 707/3 |
| 2006/0064736 A1* | 3/2006 | Ahuja et al. | 726/1 |
| 2006/0075228 A1* | 4/2006 | Black et al. | 713/167 |
| 2006/0184789 A1* | 8/2006 | Karasawa et al. | 713/160 |
| 2006/0200339 A1* | 9/2006 | Satake et al. | 704/4 |
| 2008/0028305 A1* | 1/2008 | Kim et al. | 715/273 |
| 2008/0040776 A1* | 2/2008 | Bauer et al. | 726/3 |

* cited by examiner

| 502 | 504 | |
|---|---|---|
| COVER STORY | TRANSLATED | |
| ALCHEMICAL SPELL | CRYPTOGRAPHIC ALGORITHM | 506 |
| INPUT MATERIAL | INPUT FORMAT | 508 |
| OUTPUT MATERIAL | OUTPUT FORMAT | 510 |
| COPPER | BINARY | 512 |
| SILVER | LETTERS ONLY | 514 |
| GOLD | TEXT | 516 |

*FIG. 5*

```
<HTML>
<HEAD>
<H2>Enter Alchemical Spell Details:</H2>                602

Input Material: <SELECT NAME="inp_material">            603
        <OPTION VALUE="copper">Copper</OPTION>          604
        <OPTION VALUE="silver">Silver</OPTION>          606
        <OPTION VALUE="gold">Gold</OPTION>              608
</SELECT></BR>

Output Material: <SELECT NAME="out_material">           609
        <OPTION VALUE="copper">Copper</OPTION>          610
        <OPTION VALUE="silver">Silver</OPTION>          612
        <OPTION VALUE="gold">Gold</OPTION>              614
</SELECT></BR>

Comments: <INPUT TYPE="TEXT" NAME="comments"SIZE=50>

</HEAD>
</HTML>
```

```
<HTML>
<HEAD>
<H2>Enter Cryptographic Algorithm Details:</H2>   /802

Input Format: <SELECT NAME="inp_material">   /803
      <OPTION VALUE="copper">Binary</OPTION>   /804
      <OPTION VALUE="silver">Letters Only</OPTION>
      <OPTION VALUE="gold">Text</OPTION>   806
</SELECT></BR>                                 808

Output Format: <SELECT NAME="out_material">   /809
      <OPTION VALUE="copper">Binary</OPTION>   /810
      <OPTION VALUE="silver">Letters Only</OPTION>
      <OPTION VALUE="gold">Text</OPTION>   812
<\SELECT></BR>                                814

Comments: <INPUT TYPE="TEXT" NAME="comments" SIZE=50>

</HEAD>
</HTML>
```

```
<HTML>
<HEAD>
<H2>Alchemical Spell</H2>  /1002
<TABLE>
<TR><TH>Input Material</TH><TD>Copper</TD></TR>  /1004
<TR><TH>Output Material</TH><TD>Silver</TD></TR>  /1006
<TR><TH>Comments</TH><TD>*ENC*fdshl;gf56903hdjhgslh3445h@##$%*/ENC*</TD></TR>  1008
</TABLE>
</HEAD>
</HTML>
```

```
<HTML>
<HEAD>
<H2>Cryptographic Algorithm</H2>   /1202
<TABLE>
<TR><TH>Input Format</TH><TD>Binary</TD></TR>   /1204
<TR><TH>Output Format</TH><TD>Letters Only</TD></TR>   /1206
<TR><TH>Comments</TH><TD>used by the Iraqi military</TD></TR>   ~1208
</TABLE>
</HEAD>
</HTML>
```

METHOD AND APPARATUS FOR USING A PROXY TO MANAGE CONFIDENTIAL INFORMATION

This application is a continuation of application Ser. No. 11/149,393, filed Jun. 9, 2005, status pending.

BACKGROUND OF THE INVENTION

1. Field of the Invention

The present invention relates generally to an improved data processing system and in particular to a method and apparatus for processing data. Still more particularly, the present invention relates to a method, apparatus, and computer usable code for managing confidential information.

2. Description of the Related Art

In application development, large amounts of time and resources are required to build applications. Some businesses develop applications internally. Such an ability is often a luxury enjoyed only by those businesses or entities that have sufficient resources. In other cases, internal development is impractical given the internal resources available and time deadlines that are set to develop applications. Business application development is often outsourced to an external contractor. Oftentimes, the customer organization does not want to expose their business details to the external contractor. On the other hand, for both development of applications and ongoing maintenance of these applications, a contractor needs to know how the application will function.

Currently, two solutions are present for this particular problem. One solution involves trusting the contractor with the sensitive or confidential information. When the application involves a government contract, this situation usually involves time and expense for obtaining a security clearance for each employee of the contractor company that will have access to the product during development or maintenance. Another solution involves giving the contract a "cover story". The cover story is one known to the contractor for purposes of illustrating the needed business logic. The different labels or names given various components are fictitious ones that are later changed when the application is complete. This solution, however, does not facilitate ongoing maintenance by a contractor.

Therefore, it would be advantageous to have an improved method, apparatus, and computer usable code for managing confidential or sensitive information in an application for development and maintenance of the application.

SUMMARY OF THE INVENTION

The present invention provides a method, apparatus, and computer usable code for managing confidential data. A request is received to access an application from a user, wherein the application includes logic to process the confidential data. One of a first interface or a second interface is selected based on an identification whether the user is permitted to see the confidential data to form a selected interface in response to receiving the request. A selected interface is presented to the user. The first interface presents the confidential information and second interface presents non-confidential information without presenting the confidential information. The second interface allows access to the logic in the application without accessing the confidential data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
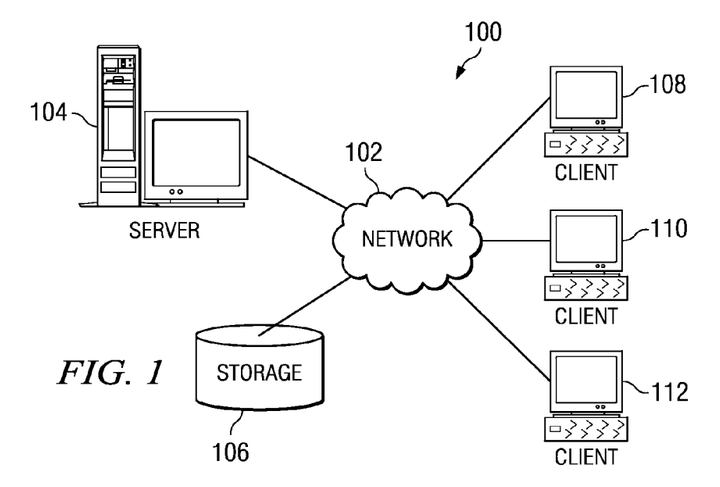
FIG. 1 depicts a pictorial representation of a network of data processing systems in which aspects of the present invention may be implemented.
Figure 2:
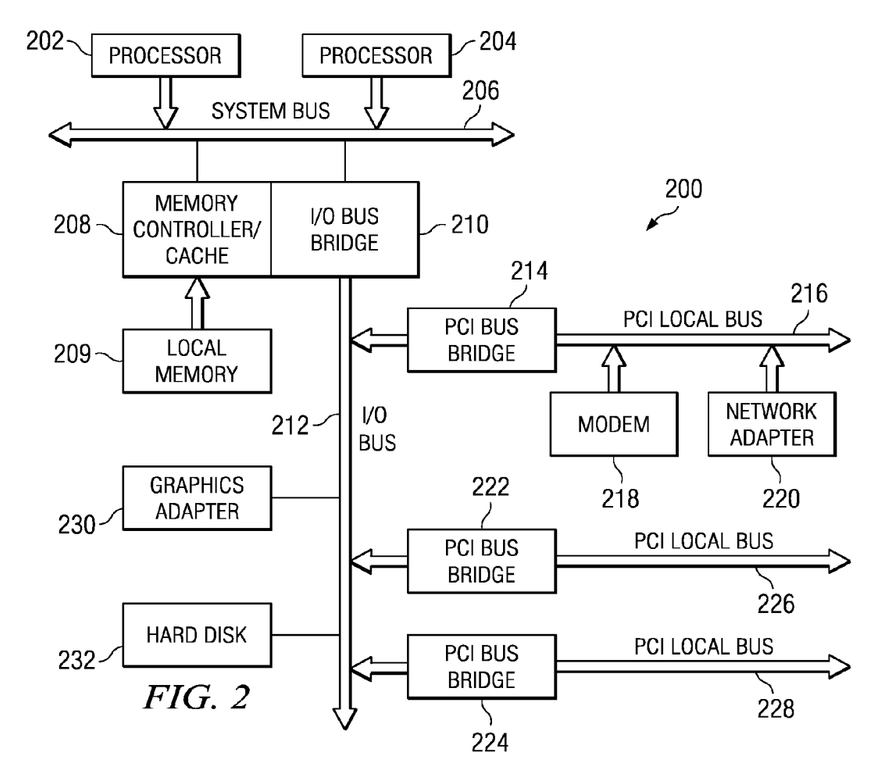
FIG. 2 is a block diagram of a data processing system that may be implemented as a server in accordance with an illustrative embodiment of the present invention.
Figure 3:
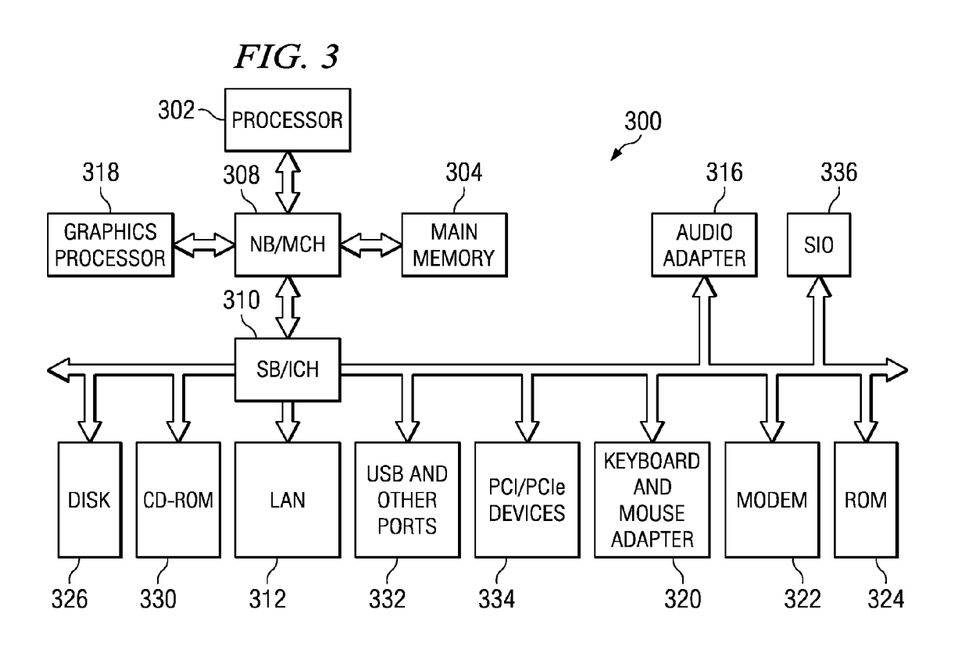
FIG. 3 is a block diagram of a data processing system shown in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCT local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the buss system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

The present invention provides an improved method, apparatus, and computer usable code for managing sensitive or confidential information for application development and maintenance. The mechanism of the present invention as illustrated in these embodiments is especially useful for business application development in which outside contractors are used. In the illustrated embodiments, a proxy is employed to change the interface presented to a user depending on the user's identity. In the illustrative examples, the strings or labels are changed as well as selective encrypting and decrypting of data.

In this manner, a "classified", interface may be displayed or presented to real users while an unclassified interface is presented to employees of the contracting company. This unclassified interface is also referred to as the "cover story" interface.

Figure 4:
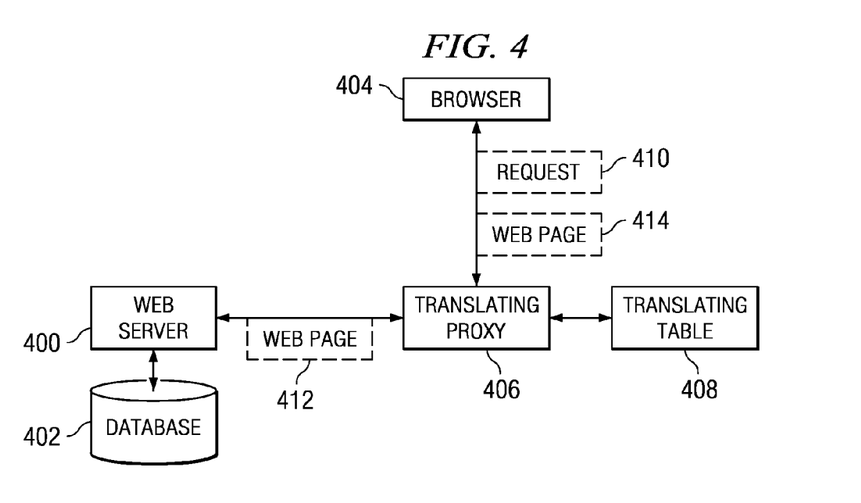
FIG. 4 is a diagram illustrating components used in managing data in accordance with an illustrative embodiment of the present invention.

Turning next to FIG. 4, a diagram illustrating components used in managing data is depicted in accordance with an illustrative embodiment of the present invention. In this example, Web server 400 is employed during development, maintenance, and use of applications. The logic for an application is executed or hosted on Web server 400 in these examples. Logic is computer usable code that embodies different processes and functions for the application. Business logic is the computer usable code that embodies processes and functions for business-oriented aspects of the application. These aspects may include, for example, receiving orders, filling orders, and generating bills. Data regarding the applications are stored in database 402. This data may include, for example, Web pages, logic or business logic for the applications, as well as data. In these examples, database 402 contains unclassified information or data. In other words, the information or data contained in database 402 may be viewed by anyone accessing database 402.

A user may access the application hosted by Web server 400 through browser 404. The requests and data transferred between browser 404 and Web server 400 are mediated or handled through translating proxy 406 in these illustrative examples. Translating proxy 406 allows for a selected presentation of interfaces to a user at browser 404. The particular interface selected for the user depends on the user identification in these examples. The user identification may be made a number of different ways. For example, a user name or ID may be employed. Authentication of the user may be made through different mechanisms, such as passwords, certificates, or encrypted keys. The particular authentication and identification method used may differ depending on the particular implementation. In this example, translating proxy 406 uses translating table 408 in presenting different interfaces to users.

In this manner, different interfaces may be presented to a user based on the user identification through translating proxy 406. This mechanism allows for a "cover story" interface to be presented to users who do not need to know the details of the confidential information, but allowing both users to develop and maintain the business logic. The real or classified interface is presented by translating proxy 406 to the appropriate users accessing the application.

As an example, a user at browser 404 may send a request to translating proxy 406. The request takes the form of a universal resource locator (URL) in this example as well as information that may have been filled in a Web form. Translating proxy 406 translates the URL if necessary. For example, the URL may be translated if the user enters a URL and it is necessary to translate the URL to one that uses the unclassified or cover story interface for the application. Translating proxy 406 sends request 410 to Web server 400. Web server 400 may access database 402 to read and/or write information based on the execution of the logic for the application at Web server 400. Web server 400 then sends Web page 412 to translating proxy 406 as a reply to request 410. In these illustrative examples, Web page 412 is an unclassified version of the interface and information retrieved from database 402.

Translating proxy 406 translates Web page 412 to generate Web page 414, a translated version of Web page 412 and returns as Web page to browser 404. In these examples, translating proxy 406 only translates information that is shown to the user, and not labels inside the tags, such as a value that is returned by multiple-choice fields in the Web forms. This translation is performed using translating table 408. This translated version contains classified information or data that is to be viewed only by authorized users in these examples.

Figure 5:
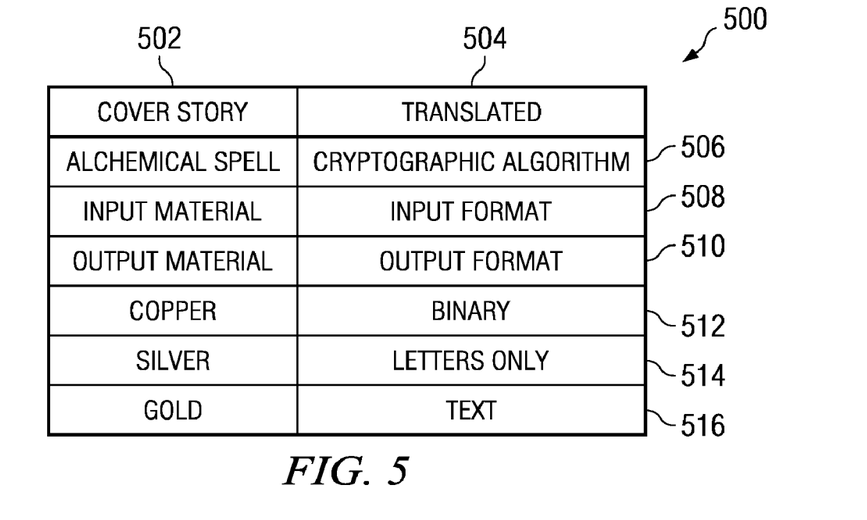
FIG. 5 is an example of translation information in accordance with an illustrative embodiment of the present invention.

With reference now to FIG. 5, an example of translation information is depicted in accordance with an illustrative embodiment of the present invention. Table 500 is an example of information that may be found in translating table 408 in FIG. 4. In this illustrative example, column 502 contains the data for the "cover story" interface, while column 504 contains the information for the translating or real interface that is shown to users cleared or allowed to view the confidential information.

As can be seen in table 500, entries 506, 508, 510, 512, 514, and 516 are present in table 500. In entry 506, the cover story value is "alchemical spell", while the translated information is "cryptographic algorithm". Entry 508 has "input material" that translates to "input format", and entry 510 has "output material" that translates to "output format". "Copper" is translated to "binary" in entry 512, "silver" is translated to "letters only" in entry 514, and "gold" is translated to "text" in entry 516.

Figure 6:
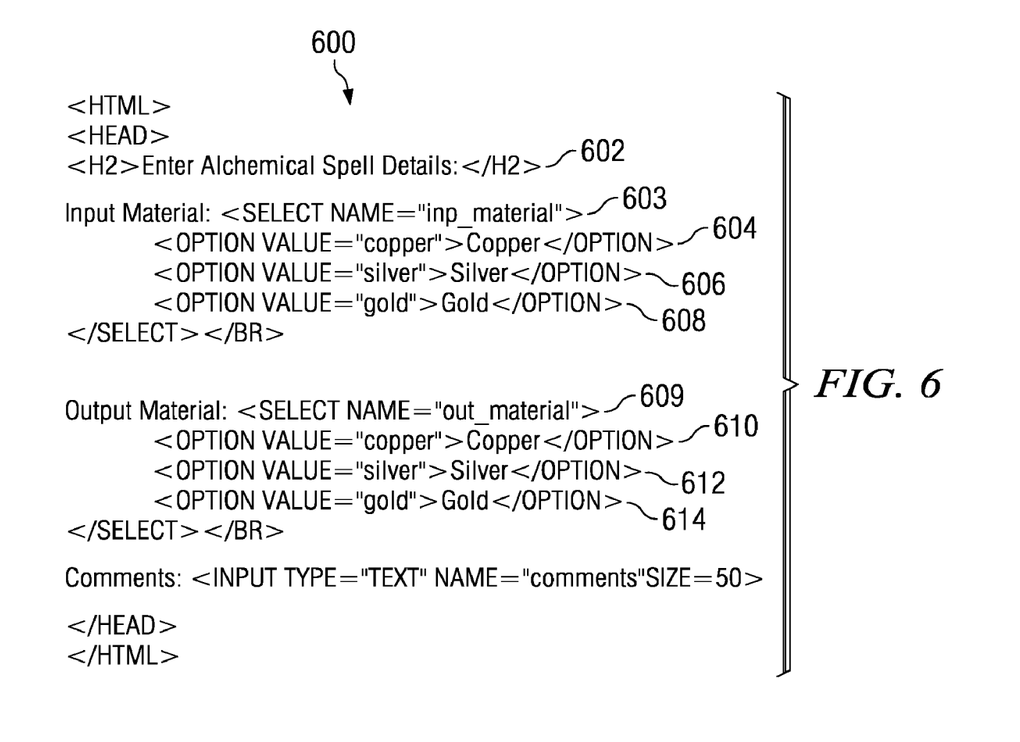
FIG. 6 is an example of a Web page used to present an interface to a user in accordance with an illustrative embodiment of the present invention.

Turning now to FIG. 6, an example of a Web page used to present an interface to a user is depicted in accordance with an illustrative embodiment of the present invention. Code 600 is an example of a code used to generate a Web page, such as Web page 412 in FIG. 4. In these examples, the values are those for a "cover story". This Web page is typically returned to a user unless a translation is made to allow the actual interface to be presented to the user. Code 600 contains values that are for a "cover story" to be presented to the user that is not to see the confidential information. The data for these values are found in line 602, 603, 604, 606, 608, 609, 610, 612, and 614 in code 600.

Figure 7:
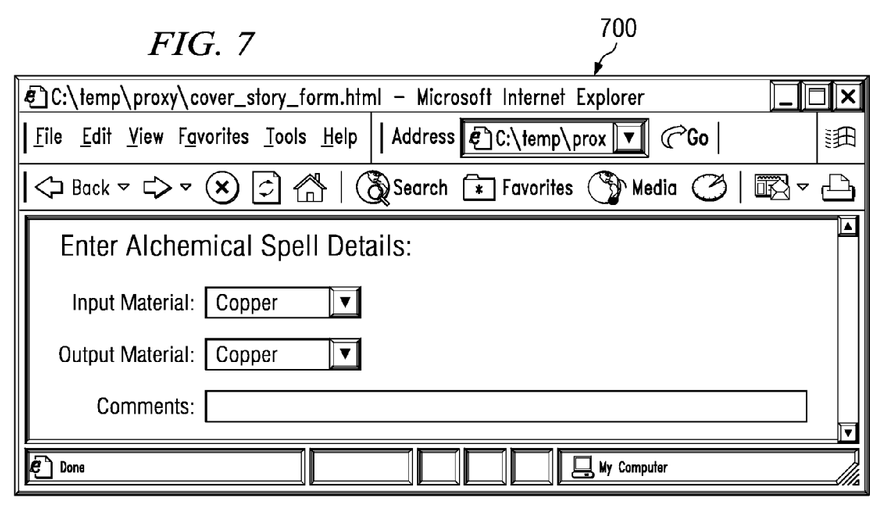
FIG. 7 is a diagram illustrating display of a Web page in a browser in accordance with an illustrative embodiment of the present invention.

Turning now to FIG. 7, a diagram illustrating display of a Web page in a browser is depicted in accordance with an illustrative embodiment of the present invention. In this example, graphical user interface 700 is an example of an interface presented to a user through browser 404 when code 600 is displayed for an untranslated or unclassified Web page. In this example, Web page 412 is displayed in browser 404 to present graphical user interface 700 to the user.

Figure 8:
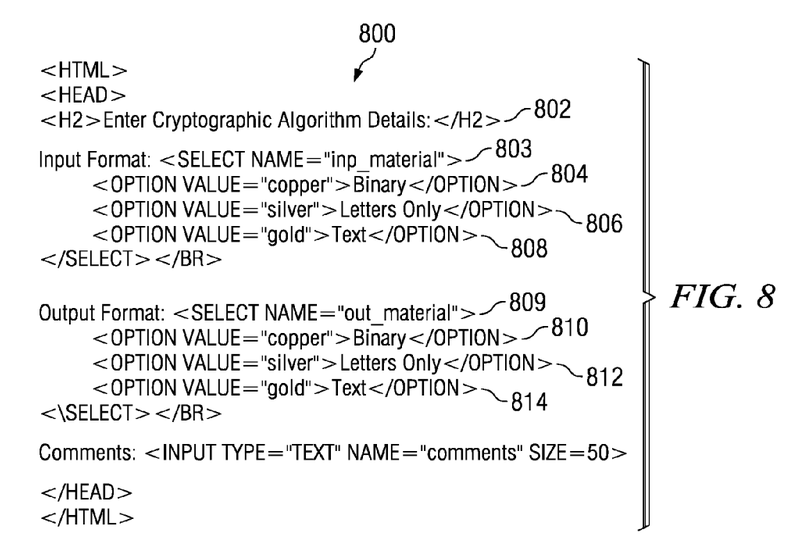
FIG. 8 is code for a translated Web page in accordance with an illustrative embodiment of the present invention.

Turning now to FIG. 8, code for a translated Web page is depicted in accordance with an illustrative embodiment of the present invention. In this example, code 800 contains translations for values in lines 802, 803, 804, 806, 808, 809, 810, 812, and 814. As can be seen when comparing these lines to lines 602, 603, 604, 606, 608, 609, 610, 612, and 614 in FIG. 6, the values have been translated using table 500 by translating proxy 406 to form a classified version of the Web page.

Figure 9:
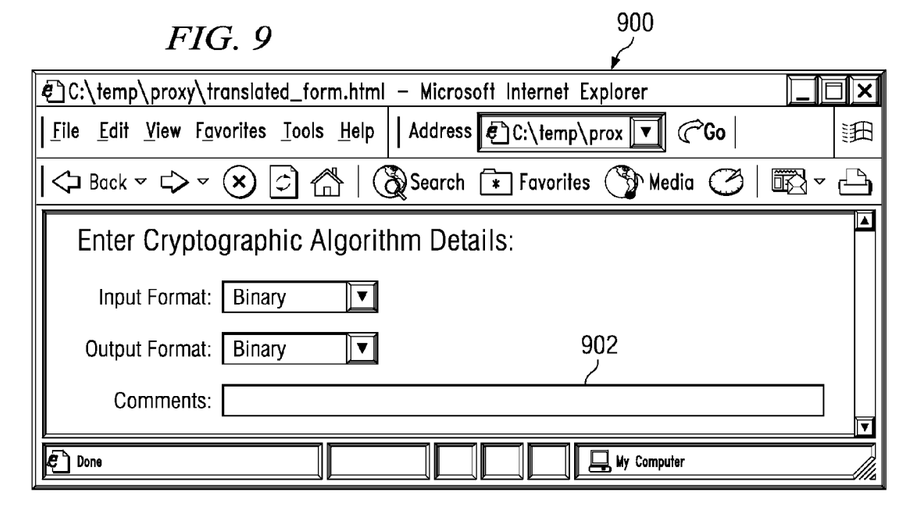
FIG. 9 is a diagram of a user interface presenting a translated Web page in accordance with an illustrative embodiment of the present invention.

Turning now to FIG. 9, a diagram of a user interface presenting a translated Web page is depicted in accordance with an illustrative embodiment of the present invention. In this example, graphical user interface 900 is a display of code 800 in FIG. 8. As can be seen in this example, the actual or classified interface is presented by graphical user interface 900.

The information that is to be entered in the user interface is displayed in FIGS. 7 and 9 and may be filled in and submitted. The information submitted takes the form of a request that is sent to the translating proxy, which may encrypt data entered by the user. For example, if in FIG. 9, a comment "used by the Iraqi military" is entered into field 902, this information may be encrypted such that the value submitted to the Web server and eventually stored in a database is encrypted. The encrypted form of the comment may be, for example, *ENC*fdsh;gf56903hdjhgslh3445h@,##$%*/ENC*. As a result, a request from a user who is to see an unclassified or cover story version of the interface would see the encrypted version of the comment rather than the unencrypted version.

Figure 10:
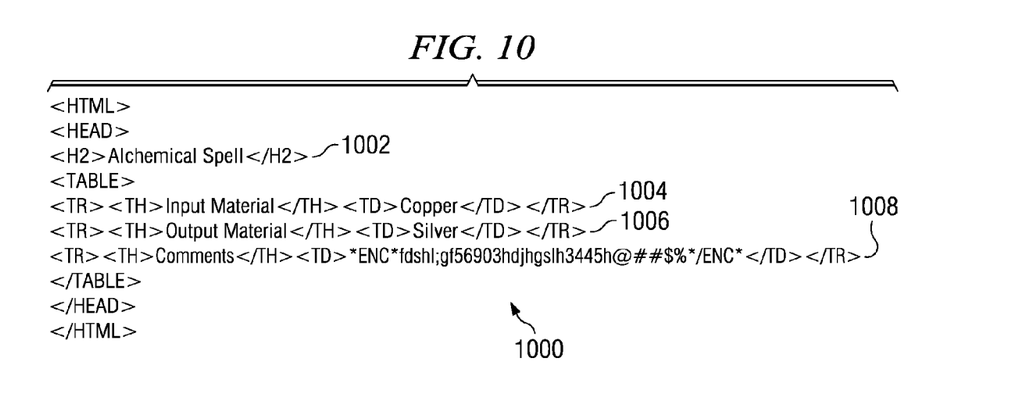
FIG. 10 is code for encrypted version of a Web page in accordance with an illustrative embodiment of the present invention.

Turning now to FIG. 10, code for encrypted version of a Web page is depicted in accordance with an illustrative embodiment of the present invention. Code 1000 is code for Web page that is returned by Web server to a translating proxy in response to a request. Code 1000 is an example of the Web page and information returned directly by the Web server. As can be seen, lines 1002, 1004, and 1006 contain values for an interface that may be presented to any user. The information in line 1008 is an encrypted form. As a result, this Web page is viewed without translation. The user only sees unclassified or cover story version. As can be seen, line 1008 shows an encrypted comment. If the user is one that is to see an unclassified version of the Web page, the translating proxy will not decrypt the comment in line 1008.

Figure 11:
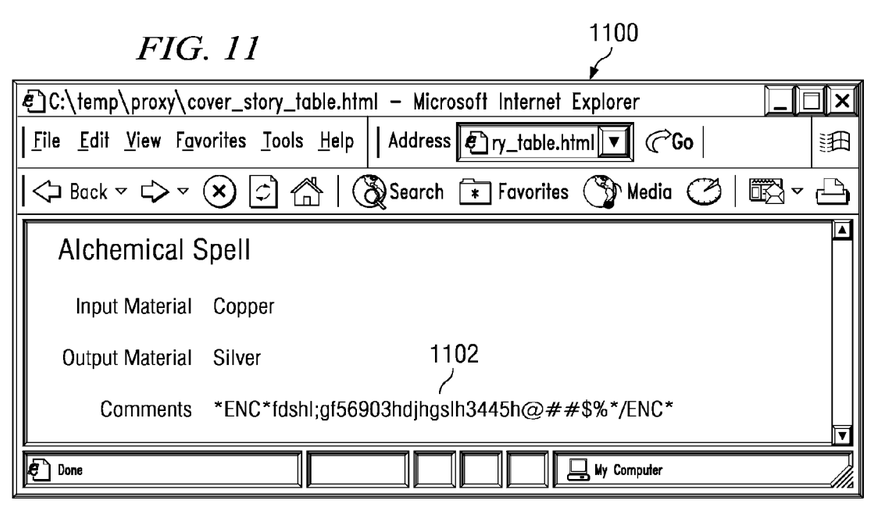
FIG. 11 is user interface in accordance with an illustrative embodiment of the present invention.

In FIG. 11, a user interface is depicted in accordance with an illustrative embodiment of the present invention. User interface 1100 shows a web page displayed in which the comment as shown in line 1102 remains in an encrypted fashion. As a result, a user who is not cleared or allowed to see confidential information is presented only with an encrypted version of the comment.

Figure 12:
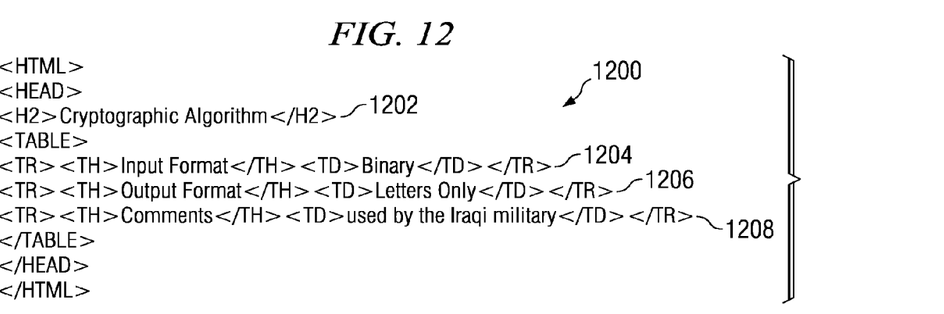
FIG. 12 is a diagram illustrating code for a Web page in accordance with an illustrative embodiment of the present invention.

When a user is allowed to see the actual or classified interface, including the confidential information, the translating proxy decrypts the comment as well as translating the values. Turning to FIG. 12, a diagram illustrating code for a Web page is depicted in accordance with an illustrative embodiment of the present invention. In this example, in code 1200, the values in lines 1202, 1204, and 1206 are translated and the information in line 1208 is unencrypted by a translating proxy, such as translating proxy 406 in FIG. 4.

Figure 13:
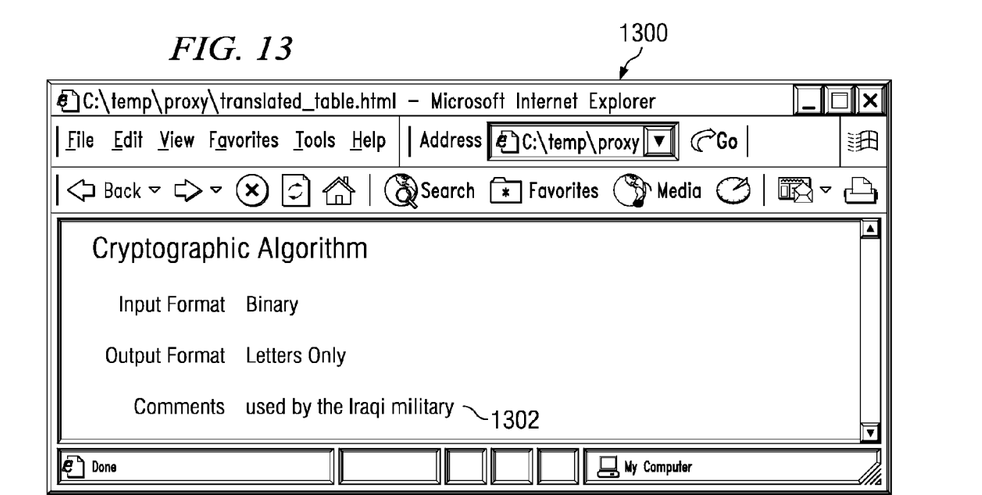
FIG. 13 is a diagram of a user interface containing decrypted information in accordance with an illustrative embodiment of the present invention.

Turning now to FIG. 13, a diagram of a user interface containing decrypted information is depicted in accordance with an illustrative embodiment of the present invention. Graphical user interface 1300 in this example shows the decrypted form of the data in line 1302 as decrypted by a translating proxy, such as translating proxy 406 in FIG. 4.

Figure 14:
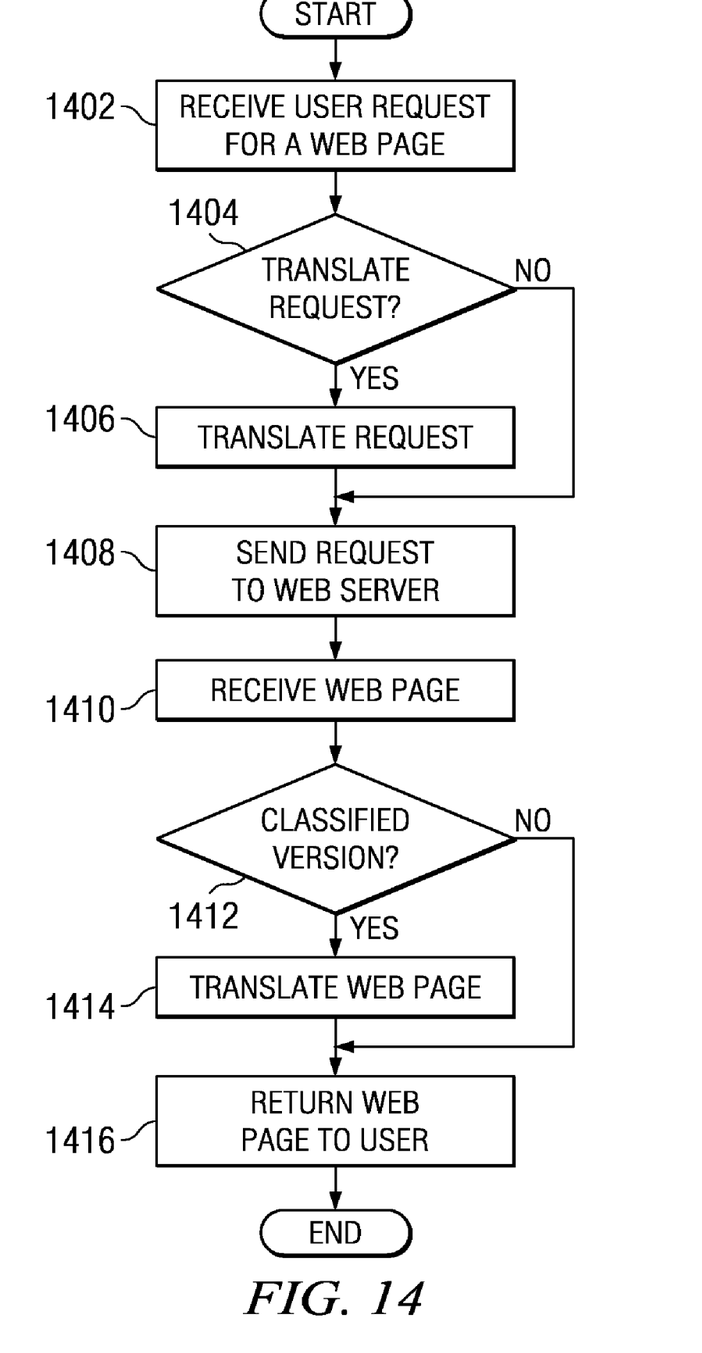
FIG. 14 is a flowchart of a process for translating a Web page for presentation to a user in accordance with an illustrative embodiment of the present invention.

With reference to FIG. 14, a flowchart of a process for translating a Web page for presentation to a user is depicted in accordance with an illustrative embodiment of the present invention. The process illustrated in FIG. 14 may be implemented in a translating proxy, such as translating proxy 406 in FIG. 4. This process is employed to select either a classified or unclassified interface for presentation to the user through selectively translating values in code for a Web page.

The process begins by receiving a user request for a Web page (step 1402) In this example, the user request is received from a browser. Next, a determination is made as to whether to translate the request (step 1404). In some cases, the URL in the request may be translated to another URL, depending on the implementation. If the request is to be translated, a translation of the request is performed (step 1406). The request is then sent to the Web server (step 1408). Thereafter, a Web page is received from the Web server (step 1410). Next, a determination is made as to whether to present a classified version of the Web page (step 1412). If a classified version of the Web page is to be presented, the Web page is translated to include the classified or confidential information (step 1414). Thereafter, the Web page is returned to the user (step 1416) with the process terminating thereafter.

With reference again to step 1404, if the request is not to be translated, the process proceeds to step 1408 without translating the request. Turning back to step 1412, if a classified version of the Web page is not to be sent to the user, the process proceeds to step 1416 without changing any values in the Web page. In this manner an unclassified version of the Web page is returned to the user in step 1416.

Figure 15:
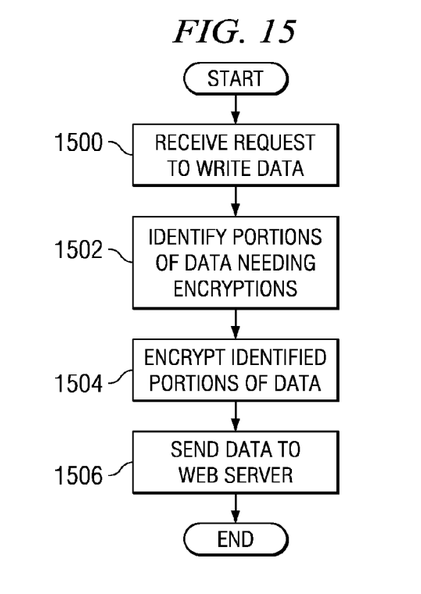
FIG. 15 is a flowchart of a process for writing data to storage in accordance with an illustrative embodiment of the present invention.

Turning now to FIG. 15, a flowchart of a process for writing data to storage is depicted in accordance with an illustrative embodiment of the present invention. The process illustrated in FIG. 15 may be implemented in a translating proxy, such as translating proxy 406 in FIG. 4. This process may be implemented when a translating proxy needs to encrypt data entered by a user.

The process begins by receiving a request to write data (step 1500). In these examples, the request may be received through a user entering information in a Web page, such as the one presented in graphical user interface 900 in FIG. 9. Next, portions of the data needing encryptions are identified (step 1502). In these examples, the translating proxy may include an additional table identifying fields that are to be encrypted. For example, the table may include two columns in which one field contains the name of the Web page to which the form is submitted and the name of the field that is to be encrypted. The portions of the identified data are encrypted (step 1504), and the data is sent to the Web server (step 1506) with the process terminating thereafter.

Figure 16:
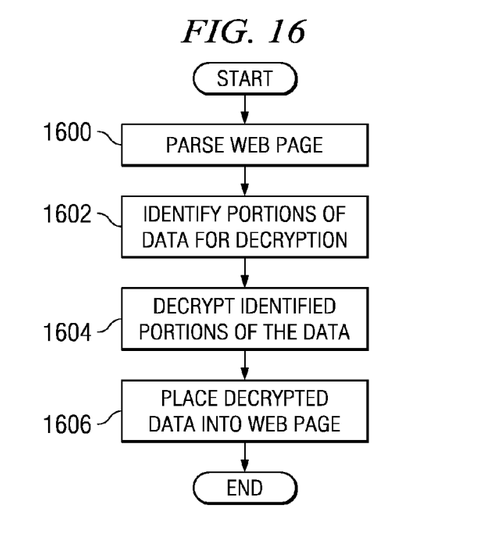
FIG. 16 is a flowchart of a process for decrypting data with an illustrative embodiment of the present invention.

With reference to FIG. 16, a flowchart of a process for decrypting data is depicted with an illustrative embodiment of the present invention. The process illustrated in FIG. 16 may be implemented in a translating proxy, such as translating proxy 406 in FIG. 4. This particular process may be implemented when a proxy needs to decrypt data received from a Web server.

The process begins by parsing the Web page received from the Web server (step 1600). Next, the portions of data needing decryption are identified (step 1602). The identified portions of the data are decrypted (step 1604), and the decrypted data is placed into the Web page in place of the encrypted data (step 1606) with the process terminating thereafter. In step 1604, the portions of data to be decrypted may be identified by using a set of tags. For example, encrypted data may be found between the tags "*ENC*" and "*/ENC*" as shown in FIGS. 10 and 12.

Thus, the present invention provides an improved method, apparatus, and computer usable code for selectively presenting a unclassified interface to some users while presenting a classified interface to other users. The mechanism of the present invention selectively translates values returned by Web server to either present a classified interface containing confidential information or an unclassified version. Additionally, the mechanism of the present invention also may encrypt information for storage at a Web server providing for further security in maintaining secrecy regarding the business application and information.

Although the depicted examples illustrate using a translation proxy to translate the information, the mechanism of the present invention also may be implemented in a different configuration depending on the particular implementation. For example, the same database may have both classified and unclassified information, and the Web server will decide to read the classified information only if the user logging in is cleared to view the classified information. Alternatively, separate databases may be accessed by a Web server depending on whether a classified version of the interface and data is to be presented as opposed to an unclassified version. A classified interface is the real interface in these illustrative examples. This interface shows the actual information and data. An unclassified interface is an interface that may be seen by users who do not need to or are not permitted to see confidential information regarding the application.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing confidential data, method comprising:
   receiving, by a translating proxy, a request to access an application from a user, wherein the application includes logic to process the confidential data;
   responsive to receiving the request, selecting, by the translating proxy, one of a first interface or a second interface based on an identification whether the user is permitted to see the confidential data to form a selected interface, wherein the selecting step comprises: determining whether the user is allowed to access the confidential data, responsive to a determination that the user is allowed to access the confidential data, sending the request to a Web server, and responsive to receiving a Web page from the Web server, translating the Web page to include the confidential information to form a translated Web page; and
   forwarding, by the translating proxy, the selected interface to the user, wherein the first interface presents the confidential information and second interface presents non-confidential information without presenting the confidential information and wherein the second interface allows access to the logic in the application without accessing the confidential data.

2. The method of claim 1, wherein the determining step comprises:
   identifying, by a translating proxy, and authenticating, by a translating proxy, the user from the request.

3. The method of claim 1 further comprising:
   responsive to receiving the Web page from the Web server, determining, by a translating proxy, whether the Web page includes encrypted data; and
   responsive to the Web page including encrypted data, decrypting, by a translating proxy, the encrypted data.

4. The method of claim 1, wherein the receiving step, the selecting step, and the presenting step are performed by a proxy server.

5. The method of claim 1, wherein the first interface is a classified interface and wherein the second interface is an unclassified interface.

6. The method of claim 1 further comprising:
   responsive to the request, including data to be written to storage, identifying, by a translating proxy, data entered by the user;
   encrypting, by the translating proxy, the data entered by the user to form encrypted data; and sending, by a translating proxy, encrypted data to the storage.

7. The method of claim 1, wherein the selecting step further comprises:
responsive to a determination that the user is not allowed to access the confidential data, sending the request to a Web server; and
responsive to receiving a Web page from the Web server, not translating the Web page to include the confidential information to form a translated Web page.

8. A computer program product comprising:
a computer usable hardware including computer usable program code for managing confidential data, the computer program product comprising:
computer usable program code for receiving a request to access an application from a user, wherein the application includes logic to process the confidential data;
computer usable program code, responsive to receiving the request, for selecting one of a first interface or a second interface based on an identification whether the user is permitted to see the confidential data to form a selected interface, wherein the selecting step comprises: computer usable program code for determining whether the user is allowed to access the confidential data, computer usable program code, responsive to a determination that the user is allowed to access the confidential data, for sending the request to a Web server, and computer usable program code, responsive to receiving a Web page from the Web server, for translating the Web page to include the confidential information to form a translated Web page; and
computer usable program code for presenting the selected interface to the user, wherein the first interface presents the confidential information and second interface presents non-confidential information without presenting the confidential information and wherein the second interface allows access to the logic in the application without accessing the confidential data.

9. The computer program product of claim 8, wherein the computer usable program code for the determining step comprises:
computer usable program code for identifying and authenticating the user from the request.

10. The computer program product of claim 8, wherein the computer usable program code further comprises:
computer usable program code, responsive to receiving the Web page from the Web server, for determining whether the Web page includes encrypted data; and
computer usable program code, responsive to the Web page including encrypted data, for decrypting the encrypted data.

11. The computer program product of claim 8, wherein the computer usable program code for receiving step, the selecting step, and the presenting step are performed by a proxy server.

12. The computer program product of claim 8, wherein the computer usable program code for first interface is a classified interface and wherein the second interface is an unclassified interface.

13. The computer program product of claim 8, wherein the computer usable program code for further comprises:
computer usable program code, responsive to the requesting including data to be written to storage;
computer usable program code for identifying data entered by the user;
computer usable program code for encrypting the data entered by the user to form encrypted data; and computer usable program code for sending encrypted data to the storage.

14. The computer program product of claim 8, wherein the computer usable program code further comprises:
computer usable program code, responsive to a determination that the user is not allowed to access the confidential data, for sending the request to a Web server; and
computer usable program code, responsive to receiving a Web page from the Web server, for not translating the Web page to include the confidential information to form a translated Web page.

15. A data processing system comprising:
a bus;
a communications unit connected to the bus;
a memory connected to the bus, wherein the memory includes computer usable code for managing confidential data; and
a processor unit connected to the bus, wherein the processor unit executes the computer usable code to receive a request to access an application from a user, wherein the application includes logic to process the confidential data; select one of a first interface or a second interface based on an identification whether the user is permitted to see the confidential data to form a selected interface in response to receiving the request, wherein the request is for a Web page and wherein in executing the computer usable code to select one of a first interface or a second interface based on an identification whether the user is permitted to see the confidential data to form a selected interface, the processor further executes the computer usable code to determine whether the user is allowed to access the confidential data, sending the request to a Web server in response to a determination that the user is allowed to access the confidential data, and, translate the Web page to include the confidential information to form a translated Web page in response to receiving a Web page from the Web server; and present the selected interface to the user, wherein the first interface presents the confidential information and second interface presents non-confidential information without presenting the confidential information and wherein the second interface allows access to the logic in the application without accessing the confidential data.

16. The data processing system of claim 15, wherein in executing the computer usable code to determine whether the user is allowed to access the confidential data, the processor further executes the computer usable code to identify and authenticate the user from the request.

17. The data processing system of claim 15, wherein the processor unit further executes the computer usable code to determine whether the Web page includes encrypted data in response to receiving the Web page from the Web server and decrypt the encrypted data in response to the Web page including encrypted data.

18. The data processing system of claim 15, wherein the first interface is a classified interface and wherein the second interface is an unclassified interface.

19. The data processing system of claim 15, wherein the processor unit further executes the computer usable code:
responsive to a determination that the user is not allowed to access the confidential data, to send the request to a Web server; and
responsive to receiving a Web page from the Web server, to not translate the Web page to include the confidential information to form a translated Web page.

* * * * *